US010222012B2

(12) United States Patent
Kim et al.

(10) Patent No.: US 10,222,012 B2
(45) Date of Patent: Mar. 5, 2019

(54) CEILING-BASED LED AUDITORIUM PATHWAY LIGHTING APPARATUS

(71) Applicant: Tempo Industries, LLC, Irvine, CA (US)

(72) Inventors: David Kim, Garden Grove, CA (US); Thomas Lueken, Beaumont, CA (US); Michael D. Bremser, Seal Beach, CA (US); Mark Shurtleff, Huntington Beach, CA (US); Dennis Pearson, Foothill Ranch, CA (US)

(73) Assignee: Tempo Industries, LLC, Irvine, CA (US)

(*) Notice: Subject to any disclaimer, the term of this patent is extended or adjusted under 35 U.S.C. 154(b) by 13 days.

(21) Appl. No.: 15/466,864

(22) Filed: Mar. 23, 2017

(65) Prior Publication Data

US 2018/0038562 A1 Feb. 8, 2018

Related U.S. Application Data

(60) Provisional application No. 62/372,161, filed on Aug. 8, 2016.

(51) Int. Cl.
*F21S 8/04* (2006.01)
*F21V 11/08* (2006.01)
(Continued)

(52) U.S. Cl.
CPC . *F21S 8/04* (2013.01); *F21S 4/28* (2016.01); *F21V 5/007* (2013.01); *F21V 11/02* (2013.01);
(Continued)

(58) Field of Classification Search
CPC ....... F21S 8/04; F21S 4/00; F21S 4/28; F21V 11/08; F21V 3/02; F21V 7/0083;
(Continued)

(56) References Cited

U.S. PATENT DOCUMENTS 3,030,670 A 4/1962 Bigelow
5,620,369 A 4/1997 Spransy et al.
(Continued)

FOREIGN PATENT DOCUMENTS

DE 102009016753 A1 10/2010
DE 102010001777 A1 8/2011
(Continued)

OTHER PUBLICATIONS

EPO 15159756.4 extended European search report, dated Apr. 12, 2015.
(Continued)

*Primary Examiner* — Diane I Lee
*Assistant Examiner* — Naomi M Wolford
(74) *Attorney, Agent, or Firm* — Lapple Ubell IP Law, LLP; Franklin D. Ubell

(57) ABSTRACT

Auditorium pathways, such as vertical and horizontal aisle ways, are illuminated by light fixtures located above the pathways, the light fixtures comprising a plurality of LEDs whose light is focused into a light beam of a width selected to illuminate the pathway. In one embodiment, the light beam is configured such that it may be disposed between a plurality of patrons and a stage or screen to illuminate a pathway while remaining invisible to the patrons.

26 Claims, 7 Drawing Sheets

(51) Int. Cl.
*G02B 27/30* (2006.01)
*F21V 5/00* (2018.01)
*F21V 11/02* (2006.01)
*F21V 13/02* (2006.01)
*F21S 4/28* (2016.01)
*F21Y 103/10* (2016.01)
*F21Y 115/10* (2016.01)
*F21V 3/02* (2006.01)
*F21W 131/406* (2006.01)
*F21V 5/04* (2006.01)
*F21W 111/02* (2006.01)
*F21W 131/407* (2006.01)

(52) U.S. Cl.
CPC .............. *F21V 11/08* (2013.01); *F21V 13/02* (2013.01); *G02B 27/30* (2013.01); *F21V 3/02* (2013.01); *F21V 5/045* (2013.01); *F21W 2111/02* (2013.01); *F21W 2131/406* (2013.01); *F21W 2131/407* (2013.01); *F21Y 2103/10* (2016.08); *F21Y 2115/10* (2016.08)

(58) Field of Classification Search
CPC .......... F21V 5/007; F21V 11/02; F21V 5/045; F21V 13/02; G02B 27/30; F21W 2131/406; F21W 2131/407; F21W 2111/02; F21Y 2103/10; F21Y 2115/10
See application file for complete search history.

(56) References Cited

U.S. PATENT DOCUMENTS

| | | |
|---|---|---|
| 6,351,920 B1 | 3/2002 | Hopkins et al. |
| 7,658,518 B2 | 2/2010 | Shwisha |
| 7,726,840 B2 | 6/2010 | Pearson et al. |
| 7,828,456 B2 | 11/2010 | Boyer et al. |
| 8,002,426 B2 | 8/2011 | Pearson et al. |
| 8,061,870 B2 | 11/2011 | Pearson et al. |
| 8,398,276 B2 | 3/2013 | Pearson et al. |
| 9,062,840 B2 | 6/2015 | Swisha et al. |
| 9,217,247 B2 | 12/2015 | Behling et al. |
| 2006/0238136 A1 | 10/2006 | Johnson, III et al. |
| 2009/0262532 A1* | 10/2009 | Wilcox ............ F21V 5/04 362/248 |
| 2010/0259931 A1* | 10/2010 | Chemel ............ F21V 17/02 362/249.02 |
| 2012/0051041 A1* | 3/2012 | Edmond ............ F21S 8/026 362/231 |
| 2012/0063138 A1* | 3/2012 | Leadford ............ F21S 2/005 362/249.02 |
| 2012/0091903 A1 | 4/2012 | Bembridge et al. |
| 2012/0235579 A1 | 9/2012 | Chemel et al. |
| 2013/0021792 A1 | 1/2013 | Snell et al. |
| 2013/0070461 A1 | 3/2013 | Pickard |
| 2013/0176722 A1 | 7/2013 | Lay et al. |
| 2013/0201674 A1 | 8/2013 | Pickard et al. |
| 2013/0208457 A1 | 8/2013 | Durkee et al. |
| 2013/0208469 A1 | 8/2013 | Progl |
| 2013/0250567 A1 | 9/2013 | Edmond et al. |
| 2013/0271979 A1 | 10/2013 | Pearson et al. |
| 2013/0272000 A1 | 10/2013 | Pearson et al. |
| 2013/0279165 A1 | 10/2013 | Pearson et al. |
| 2013/0279179 A1 | 10/2013 | Pearson et al. |
| 2013/0279180 A1 | 10/2013 | Pearson et al. |
| 2014/0016315 A1* | 1/2014 | Yu ............ F21V 11/00 362/235 |
| 2016/0014869 A1* | 1/2016 | Pearson ............ F21S 2/005 362/249.05 |
| 2016/0238202 A1 | 8/2016 | Mallory et al. |

FOREIGN PATENT DOCUMENTS

| | | |
|---|---|---|
| EP | 2 051 001 A2 | 4/2009 |
| EP | 2 489 931 A2 | 8/2012 |
| WO | 2011139764 A2 | 11/2011 |
| WO | 2012129243 A1 | 9/2012 |

OTHER PUBLICATIONS

EPO 17175125.8 extended European search report, dated Oct. 10, 2017.

* cited by examiner

CEILING-BASED LED AUDITORIUM PATHWAY LIGHTING APPARATUS

CROSS REFERENCE TO RELATED APPLICATIONS

This application claims the benefit of and priority to U.S. Provisional Patent Application No. 62/372,161, filed Aug. 8, 2016, and entitled, "Ceiling-Based Auditorium Pathway Lighting Apparatus," the contents of which is incorporated by reference herein in its entirety.

FIELD OF THE DISCLOSURE

The subject disclosure relates to LED light fixtures and more particularly to ceiling-based LED lighting apparatus for lighting pathways or aisle ways in, for example, auditoriums and motion picture theatres.

DESCRIPTION OF RELATED ART

Auditorium lighting apparatus has been provided in the past, for example, as illustrated in U.S. Pat. No. 9,596,740, assigned to Tempo Industries, LLC, Irvine, Calif., the assignee of the subject application.

SUMMARY

According to illustrative embodiments, auditorium pathways, such as vertical and horizontal aisle ways, are illuminated by light fixtures located above the pathways, the light fixtures comprising a plurality of LEDs whose light is focused into a light beam of a width selected to illuminate the pathway. According to an illustrative embodiment, the light beam is configured such that it may be disposed between a plurality of patrons and a stage or screen to illuminate a pathway while remaining invisible to the patrons.

According to an illustrative embodiment, the light fixtures may comprise a plurality of LEDs, a plurality of vertical baffles, and a plurality of first apertures, each first aperture being disposed between a pair of the vertical baffles and over a respective one of the LEDs. A glare shield is mounted over the plurality of baffles and has a plurality of second apertures therein, each second aperture overlying a respective one of the first apertures, and a lens is disposed between the second apertures and the LEDs.

DETAILED DESCRIPTION

Figure 1:
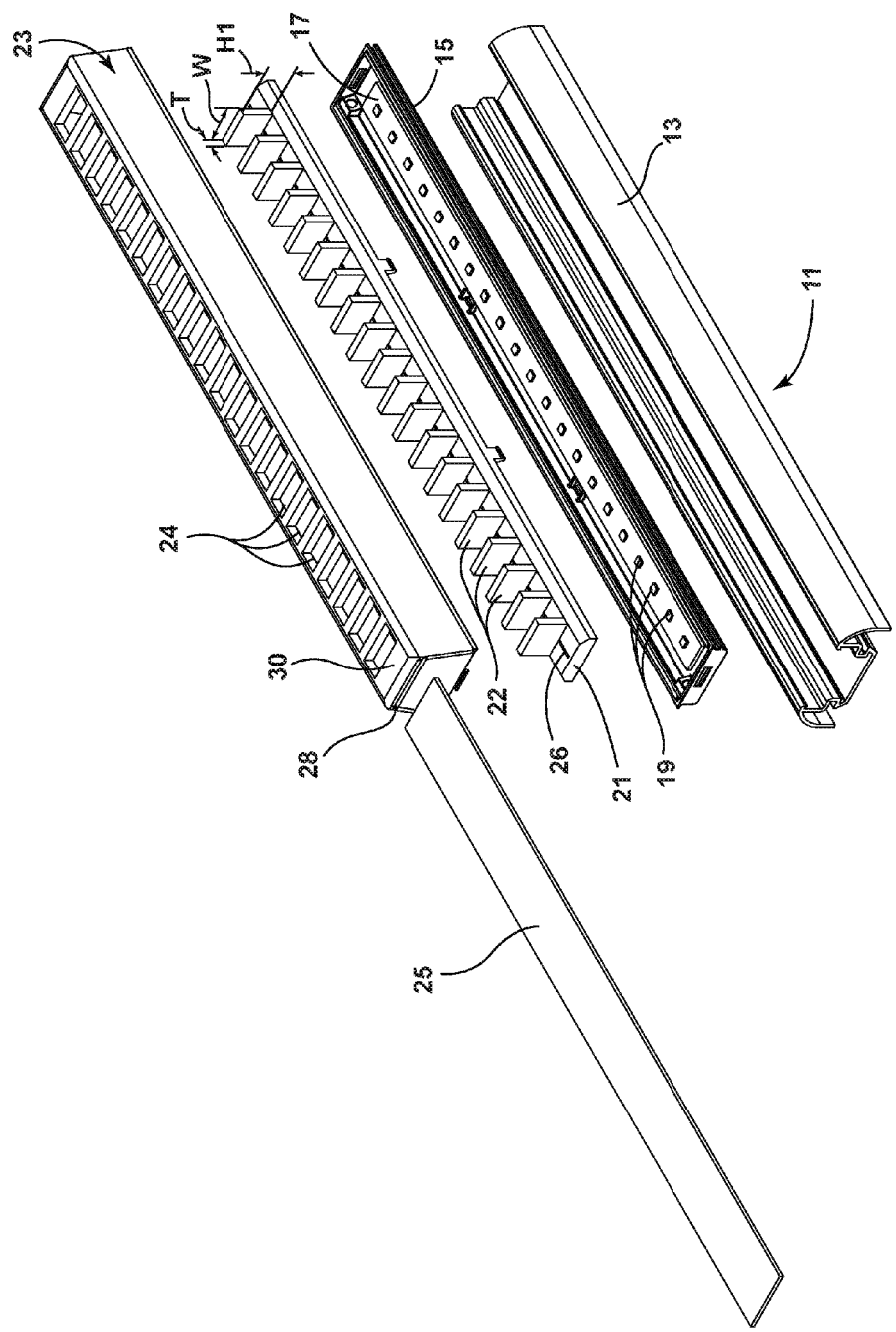
FIG. 1 is an exploded perspective view of a ceiling-based LED light fixture according to an illustrative embodiment.

An illustrative ceiling-based LED light fixture 11 is shown in FIG. 1. The light fixture 11 includes a wiring rail platform or fixture base 13, and an LED circuit board mounting platform 15, which mounts an LED circuit board 17 carrying one or more LEDs, e.g. 19. In one embodiment, there may be twenty one LEDs 19. The illustrative embodiment of FIG. 1 further includes an LED horizontal baffle/aperture component 21, an LED glare shield 23, and a collimator lens 25.

The baffle component 21 has a plurality of rectangular vertical baffles, e.g. 22, with an aperture 26 for passing light located between each pair of vertical baffles 22. In one embodiment, the height H1, width W, and thickness T of the baffles 22 are, respectively, 0.5 inches high by 0.75 inches wide by 0.125 inches thick. In one embodiment, the baffles 22 are spaced 0.535 inches apart from one another to correspond with the spacing of the LEDs 19. In one embodiment, the apertures 26 are rectangular slits of width 0.064 inches, but could have other widths or other shapes in other embodiments.

Figure 2:
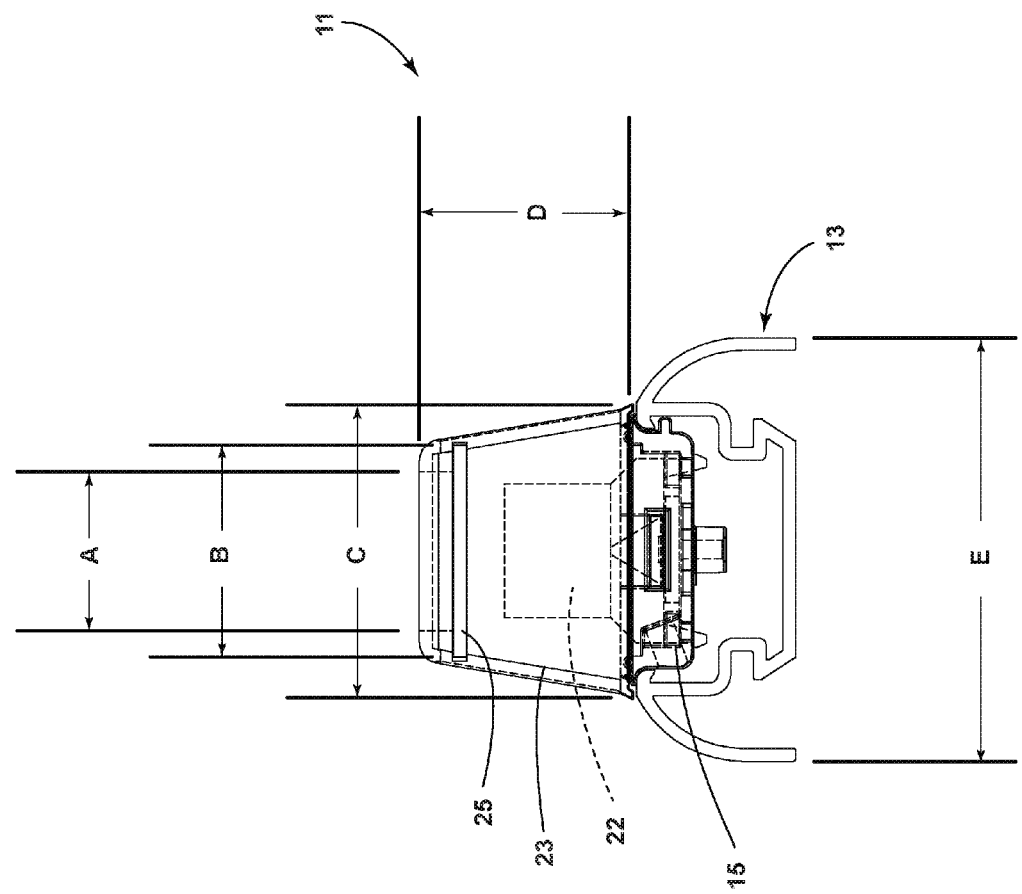
FIG. 2 is a cross-sectional view of an illustrative embodiment in an assembled state.
Figure 3:
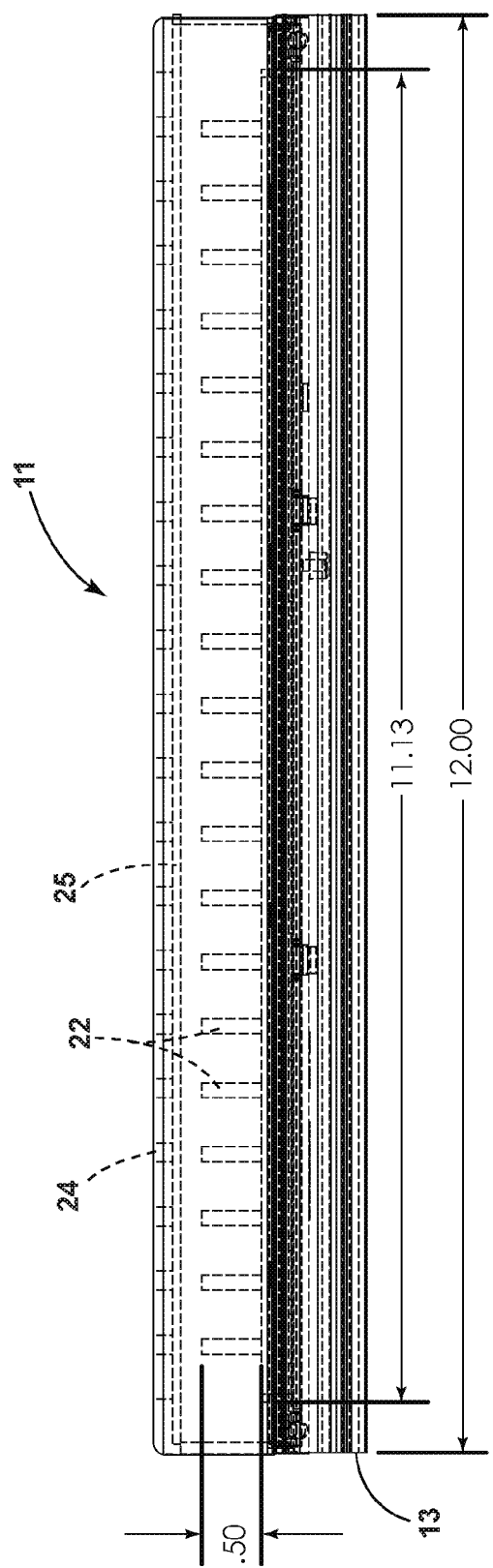
FIG. 3 is a side view of an illustrative embodiment.

In one embodiment, the glare shield 23 is trapezoidal in cross section and has dimensions A, B, C, D, E, as shown in FIG. 2 respectively of: 0.75, 1.00, 1.38 0.99 and 2.00 inches. The glare shield 23 has a plurality of apertures or slits 24 in its generally rectangular top surface 30. In one embodiment, these slits 24 are equally spaced apart from one another, and each slit 24 has dimensions of 0.375 inches wide by 0.75 inches long. In one embodiment, each aperture 24 is centrally positioned over one of the apertures 26 in the baffle 21. The apertures 24 may have other shapes in other embodiments, for example, such as circular.

In one embodiment, the collimator lens 25 is a Fresnel lens. In one embodiment, the collimator lens 25 is eleven inches long and slides into a horizontal slit 28 in the glare shield 23. In such an embodiment, the circuit board 17 may be 11.13 inches long. Different dimensions of course may be used in other embodiments.

In one illustrative embodiment, the circuit board mounting platform 15 may be mounted in conforming channels in the wiring rail platform 13. The horizontal baffle/aperture component 21 is positioned above the circuit board mounting platform 15 and the LEDs 19, and the LED glare shield 23 with collimator lens 25 in place is mounted down over the baffle/aperture component 21 so as to encase it.

Figure 6:
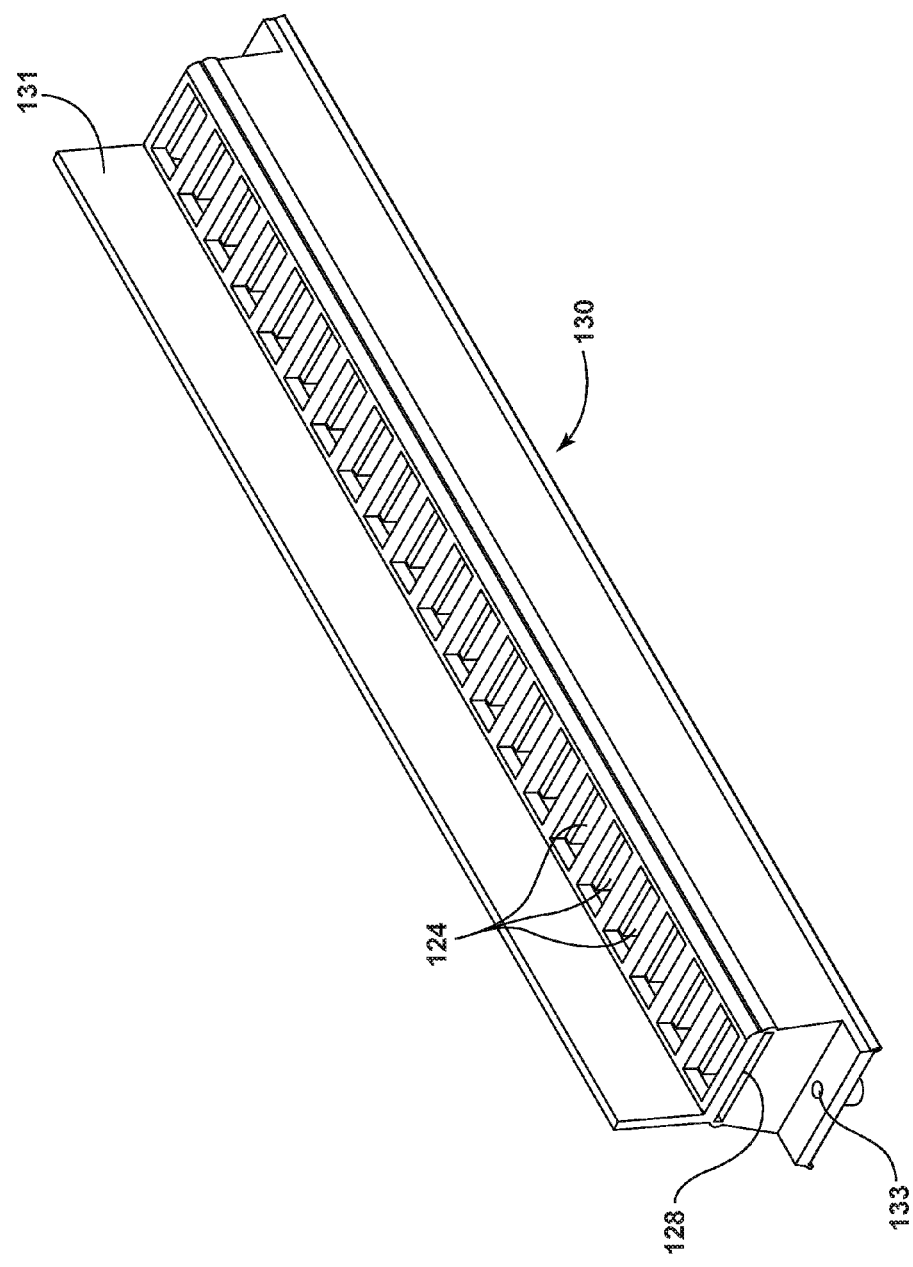
FIG. 6 is a perspective view of an alternate embodiment.
Figure 7:
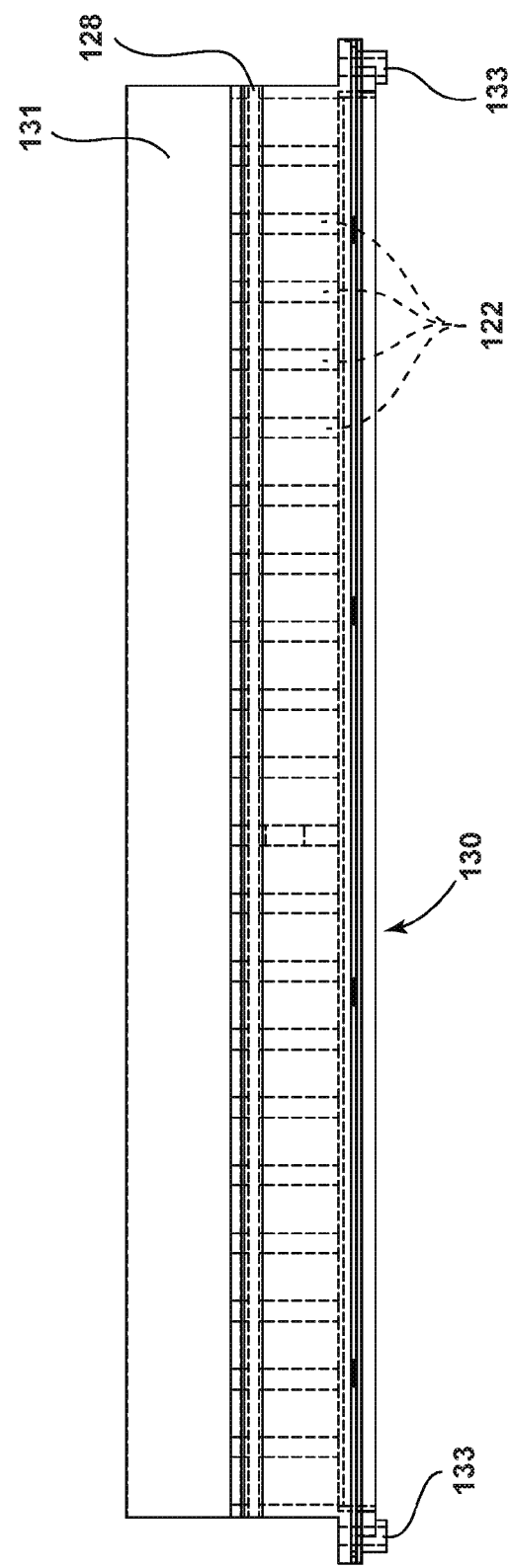
FIG. 7 is a side view of the embodiment of FIG. 6.

In the alternate embodiment shown in FIGS. 6 and 7, the baffle/aperture component 21 and glare shield 23 may be formed as a single component 130, for example, by a 3D printing process. The single component 130 has baffles 122 and a slit 128 for receiving a lens such as lens 25 of FIG. 1. Apertures are formed between the baffles 122 as discussed in connection with FIG. 1. Bosses 133 for receiving screws or other mechanical fasteners are formed at each end of the component 130 to facilitate attachment of the component 130 to a mounting platform such as mounting platform 15 of FIG. 1. An optional shield 131 is also formed along a top edge of the component 130 in one embodiment.

In one embodiment, the wiring rail platform 13 may be an extruded metal material such as aluminum, and the circuit board mounting platform 19 is cast from aluminum. The horizontal baffle/aperture 25 may be formed, for example, of thermoplastic, and the glare shield 23 may be fabricated of polycarbonate. The collimator lens 25 may also be formed of polycarbonate. Other suitable materials can of course be used for all these components in other embodiments.

As noted above, in one embodiment, the baffle/aperture component 21 includes a plurality of rectangular baffle elements 22. In between each baffle element 22 is an aperture 26, each of which is positioned to allow passage of light generated by a respective one of the LEDs 19. In one embodiment, an aperture 26 is positioned over each LED 19. In one embodiment, the LED glare shield 23 includes a plurality of slits 24, which are each positioned over a respective one of the LEDs 19.

In operation, the collimating lens 25 focuses the light generated by the LEDS 19 into a narrow beam, the baffles 22 serve to cut-off or limit the exiting angle of light from the apertures, which would result in undesirable lateral spread of light, and the glare shield 23 blocks light reflected from the internal surfaces of the baffles 22 and the lens holder from being visible to an observer on the ground or floor when located more than a few feet from the resulting light pattern on the ground or floor.

In one embodiment, the circuit board 17 may be attached to the circuit board mounting platform 15 by thermal adhesive. In one embodiment, the circuit board mounting platform 15 pivotally engages one side of the wiring rail platform 13, rests on the other side, and is fastened with screws, for example, as illustrated in U.S. patent application Ser. Nos. 14/750,407 and 15/217,546, both incorporated by reference herein.

Figure 4:
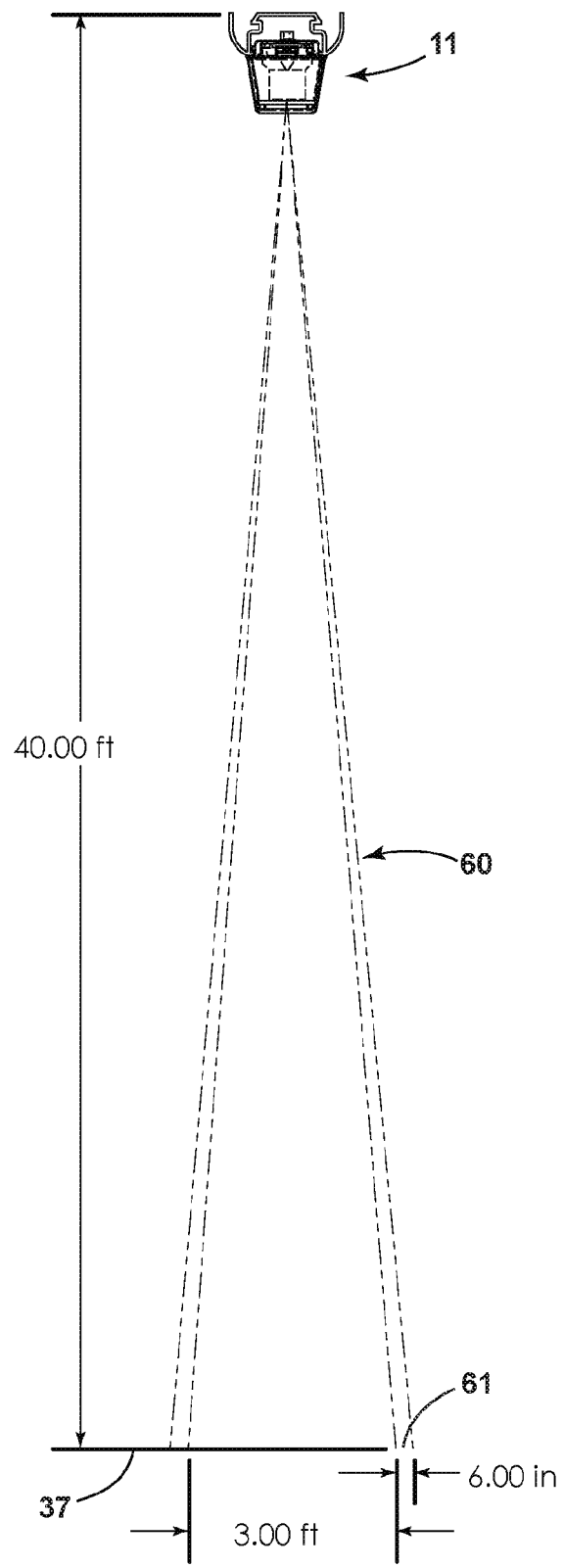
FIG. 4 is a light output plot of an illustrative ceiling-based LED light fixture.

As shown in FIG. 4, the light fixture apparatus 11 may be mounted or positioned at a height of, for example, forty feet above a surface 37 to be illuminated. In one such embodiment, the baffle/aperture 21, glare shield 23, and collimator lens 25 are constructed to generate a narrow primary beam angle which is three feet wide at the surface 37 (an angle of 4.3 degrees), while having a limited stray light "spill zone" 61 of about six inches. With such an embodiment, theatre pathways three to five feet wide may be illuminated from a fixture 11 positioned forty feet above the theatre pathway. Other embodiments may be constructed to light similar width pathways from different heights, for example, such as thirty feet.

The light provided at the surface 37 in various embodiments may be of such an intensity that the light beam 60 may be positioned between patrons and a movie screen or stage, for example, to illuminate horizontal aisle ways, while not being visible to those patrons. In one embodiment, the fixture 11 may provide illumination of 0.025 foot candles (fc) at the surface 37. In one embodiment, full power on a 12 inch module 11 puts out 10 fc, and using appropriate electronic dimmers, can be adjusted down to 0.1 fc with a preferred level of >0.2 fc to achieve light levels compliant with National Building Code and similar requirements for egress and safety illumination within movie theater auditoriums and similar public spaces.

Figure 5:
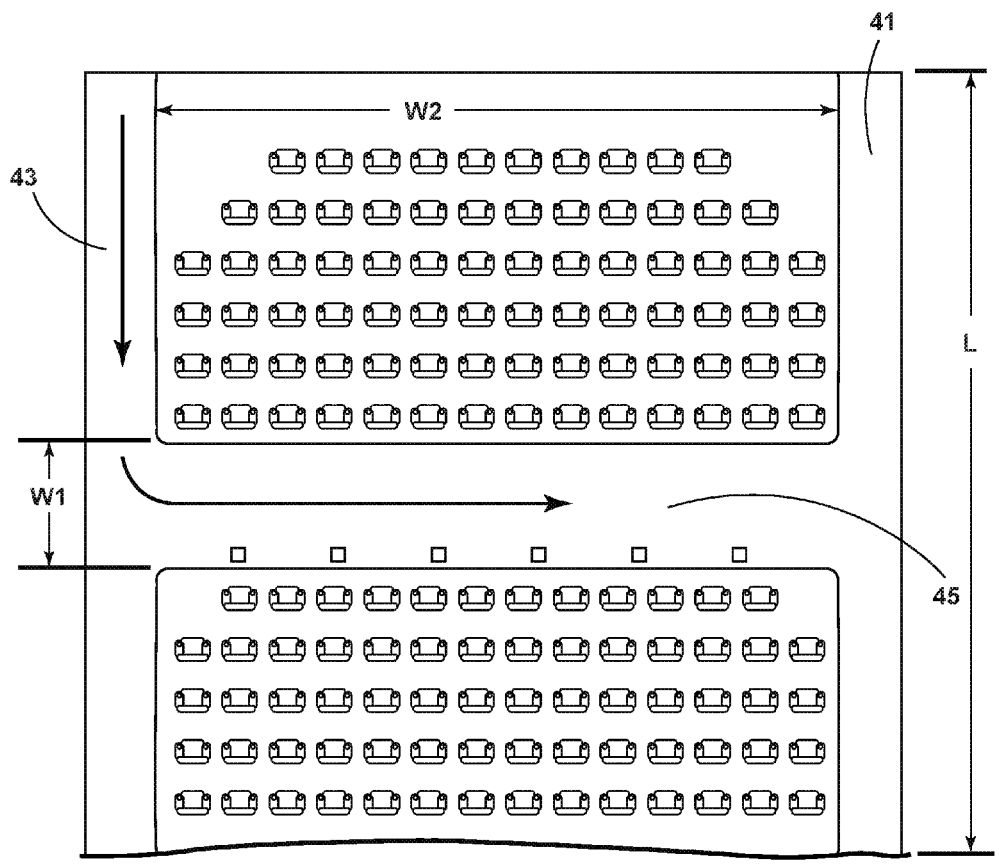
FIG. 5 is a schematic diagram of an illustrative theatre aisle way arrangement.

FIG. 5 illustrates an example of the arrangement of aisle ways in an auditorium or theatre where illustrative embodiments may find application. Such an arrangement may include first and second up and down aisle ways 41, 43 at respective sides of the auditorium and a horizontal aisle way 45 connecting the respective up and down aisle ways 41, 43. In typical cases, these aisle ways, e. g. 41, 43, may have widths in the range of three to five feet, and a length L of, for example, sixty feet, while the width of the horizontal aisle way 45 may be, for example, forty-five feet with a ceiling height of 30 to 40 feet. Light fixtures according to illustrative embodiments may be positioned or mounted in or at the ceiling of such an auditorium and employed to illuminate such pathways without disturbing the view of the stage or screen by patrons seated in the auditorium or theatre.

Thus, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. Light fixture apparatus for illuminating an auditorium aisle way, the light fixture apparatus comprising:
   a platform carrying a plurality of LEDs;
   a baffle component mounted over said platform and having a plurality of vertical baffles and a plurality of first apertures, each first aperture being disposed between a pair of the vertical baffles and over a respective one of said LEDs;
   a glare shield mounted over said plurality of baffles and having a plurality of second apertures therein, each second aperture overlying a respective one of said first apertures; and
   a lens mounted in said glare shield and disposed beneath the plurality of second apertures of the glare shield and above said plurality of LEDs, the lens being configured to focus light from the LEDs onto the aisle way from a position above the aisle way;
   the light fixture apparatus being further configured to produce a beam width selected to illuminate the aisle way.

2. The light fixture apparatus of claim 1 wherein the plurality of LEDs are mounted in a row on said platform.

3. The light fixture apparatus of claim 2 wherein said row is a linear row.

4. The light fixture apparatus of claim 1 wherein the light fixture apparatus is located at a ceiling level of an auditorium and positioned to direct light on an aisle way located beneath said light fixture apparatus.

5. The light fixture apparatus of claim 4 wherein said baffle component and said lens are configured to generate a primary beam angle which is three to five feet wide at a surface of said aisle way.

6. The light fixture apparatus of claim 5 wherein the light level provided to a said aisle way is in the range of 0.2 to 0.25 foot candles.

7. The light fixture apparatus of claim 1 wherein the plurality of vertical baffles are configured to limit the exiting angle of light from said first apertures, and wherein the glare shield is configured to block light reflected from the internal surfaces of the vertical baffles from being visible to an observer located at a floor level of the auditorium.

8. An auditorium or theatre comprising a plurality of light fixture apparatuses as recited by claim 1 mounted or positioned in or at a ceiling of the auditorium or theatre.

9. The light fixture apparatus of claim 1 wherein the lens is a single piece rectangular lens beneath which lies each of the plurality of LEDs.

10. Light fixture apparatus for illuminating an auditorium aisle way comprising:
    a plurality of LEDs;
    a plurality of vertical baffles and a plurality of first apertures, each first aperture being disposed between a pair of the vertical baffles and over a respective one of said LEDs;
    a glare shield mounted over said plurality of baffles and having a plurality of second apertures therein, each second aperture overlying a respective one of said first apertures; and
    a lens disposed between said second apertures and said LEDs; wherein the lens is configured to focus the light generated by said LEDs, wherein the plurality of vertical baffles are configured to limit the exiting angle of light from said first apertures, and wherein the glare shield is configured to block light reflected from the internal surfaces of the vertical baffles from being visible to an observer located at a floor level of the auditorium.

11. The light fixture apparatus of claim 10 wherein the plurality of LEDs are mounted in a row on a circuit board.

12. The light fixture apparatus of claim 11 wherein said row is a linear row.

13. The light fixture apparatus of claim 10 wherein the light fixture apparatus is located at a ceiling level of an auditorium and positioned to direct light on an aisle way located beneath said light fixture apparatus.

14. The light fixture apparatus of claim 13 wherein the baffles and lens are configured to generate a primary beam angle which is three to five feet wide at a surface of said aisle way.

15. The light fixture apparatus of claim 10 wherein the light level provided to a said aisle way is in the range of 0.2 to 0.25 foot candles.

16. An auditorium or theatre comprising a plurality of light fixture apparatuses as recited by claim 10 mounted or positioned in or at a ceiling of the auditorium or theatre.

17. The light fixture apparatus of claim 10 wherein said lens is a single piece rectangular lens disposed over each of the plurality of LEDs.

18. Light fixture apparatus for illuminating an auditorium aisle way located beneath the light fixture apparatus, the light fixture apparatus comprising:
a platform carrying a plurality of LEDs;
a baffle component mounted over said platform and having a plurality of vertical baffles and a plurality of first apertures, each first aperture being disposed between a pair of the vertical baffles and over a respective one of said LEDs;
a glare shield having a rectangular top surface, a first side surface extending downwardly from a first edge of said top surface, a second side surface extending downwardly from an opposite edge of said top surface, and a closed end surface having a horizontal slit therein, the first and second side surfaces extending downwardly on respective opposite sides of the plurality of vertical baffles such that the first and second side surfaces shield the plurality of vertical baffles from view, the top surface of the glare shield having a plurality of second apertures therein, each second aperture overlying a respective one of said first apertures;
a single piece planar lens mounted in the horizontal slit of the glare shield and disposed beneath the second apertures of the glare shield and above each of the plurality of LEDs, the lens being configured to focus light from the plurality of LEDs onto the aisle way; and
wherein the light fixture apparatus is configured to direct light on to the auditorium aisle way and to produce a beam width selected to illuminate the aisle way.

19. The light fixture apparatus of claim 18 wherein the plurality of LEDs are mounted in a row on a circuit board.

20. The light fixture apparatus of claim 19 wherein said row is a linear row.

21. The light fixture apparatus of claim 18 wherein the light fixture apparatus is located at a ceiling level of an auditorium and positioned to direct light on an aisle way located beneath said light fixture apparatus.

22. The light fixture apparatus of claim 18 wherein the baffles and the lens are configured to generate a primary beam angle which is three to five feet wide at a surface of said aisle way.

23. The light fixture apparatus of claim 18 wherein the light level provided to a said aisle way is in the range of 0.2 to 0.25 foot candles.

24. The light fixture apparatus of claim 18 wherein the plurality of vertical baffles are configured to limit the exiting angle of light from the plurality of first apertures, and wherein the glare shield is configured to block light reflected from the internal surfaces of the vertical baffles from being visible to an observer located on a floor level of the auditorium.

25. The light fixture apparatus of claim 18 wherein the second apertures each comprise a slit formed in said top surface.

26. The light fixture apparatus of claim 18 configured to illuminate only a floor surface of the aisle way.

* * * * *